US010819700B1

(12) United States Patent
Perlman

(10) Patent No.: US 10,819,700 B1
(45) Date of Patent: Oct. 27, 2020

(54) CLIENT-SIDE USER AUTHENTICATION CONTROL BASED ON STORED HISTORY OF INCORRECT PASSWORDS

(71) Applicant: EMC IP Holding Company LLC, Hopkinton, MA (US)

(72) Inventor: Radia J. Perlman, Redmond, WA (US)

(73) Assignee: EMC IP Holding Company LLC, Hopkinton, MA (US)

(\*) Notice: Subject to any disclaimer, the term of this patent is extended or adjusted under 35 U.S.C. 154(b) by 502 days.

(21) Appl. No.: 15/893,929

(22) Filed: Feb. 12, 2018

(51) Int. Cl.
*H04L 29/06* (2006.01)
*H04L 9/06* (2006.01)
*H04L 9/32* (2006.01)
*G06F 21/45* (2013.01)

(52) U.S. Cl.
CPC .......... *H04L 63/083* (2013.01); *H04L 9/0643* (2013.01); *H04L 9/3271* (2013.01); *G06F 21/45* (2013.01)

(58) Field of Classification Search
None
See application file for complete search history.

(56) References Cited

U.S. PATENT DOCUMENTS

| 2002/0184217 | A1* | 12/2002 | Bisbee | H04L 63/123 |
| 2004/0128270 | A1* | 7/2004 | Bachman | G06F 16/20 |
| 2007/0061864 | A1* | 3/2007 | Bali | H04L 63/083 726/2 |
| 2009/0019514 | A1 | 1/2009 | Hazlewood et al. | |
| 2010/0115583 | A1* | 5/2010 | Delia | H04L 9/3226 726/2 |
| 2014/0068757 | A1* | 3/2014 | Komatsu | H04L 63/083 726/19 |
| 2015/0058959 | A1 | 2/2015 | Gordon et al. | |
| 2016/0173485 | A1* | 6/2016 | Popoveniuc | H04L 63/1433 726/1 |
| 2016/0294838 | A1 | 10/2016 | Cross et al. | |
| 2017/0134362 | A1 | 5/2017 | Randall et al. | |
| 2017/0244694 | A1 | 8/2017 | Roth | |
| 2017/0346809 | A1 | 11/2017 | Plotnik et al. | |
| 2019/0132323 | A1* | 5/2019 | Williams | H04L 63/102 |

\* cited by examiner

*Primary Examiner* — Henry Tsang
(74) *Attorney, Agent, or Firm* — Ryan, Mason & Lewis, LLP

(57) ABSTRACT

An apparatus in one embodiment comprises a client configured to perform client-side portions of one or more user authentication protocols carried out between the client and one or more authentication servers over a network. The client stores, for one or more instances of a given one of the user authentication protocols carried out for a particular user, an incorrect password history comprising identifiers of one or more passwords previously entered by the user and indicated as being incorrect passwords by at least one of the authentication servers, and determines, for an additional password entered by the user but not yet submitted by the client to the authentication servers, whether or not the additional password is part of the incorrect password history. Responsive to the additional password being part of the incorrect password history, the client generates an alert for presentation to the user to indicate that the additional password may be an incorrect password.

20 Claims, 2 Drawing Sheets

CLIENT-SIDE USER AUTHENTICATION CONTROL BASED ON STORED HISTORY OF INCORRECT PASSWORDS

FIELD

The field relates generally to controlling access to information resources, and more particularly to techniques for implementing user authentication in an information processing system.

BACKGROUND

Information processing systems are typically configured to require user authentication before granting a client device access to resources available over a network such as the Internet. For example, online user accounts generally require successful execution of password-based user authentication protocol between a client device and an authentication server before a user is granted access to the account. These and other systems often include a lock-out mechanism that protects against password-guessing attacks by locking the user account after a certain number of incorrect passwords have been submitted in conjunction with a given instance of the user authentication protocol.

In conventional approaches, a client device will generally submit whatever password the user enters, even if the user is repeatedly entering the same incorrect password that has already been rejected by the authentication server. User interfaces on client devices usually do not "echo" typed passwords, so it may be difficult for a user to distinguish between a wrong password guess and a mistyped correct password. Also, there are systems in which an automated authentication process has a stored password, and repeatedly retries it. If the password on that system has been misconfigured, or if the password has been updated at different sites asynchronously, this can result in the user account getting locked out.

These and other similar approaches are problematic in that user accounts can be too easily locked out due to repeated submission of an incorrect password by the client device to the same authentication server. Such lockouts often necessitate execution of complex password-resetting processes, which are inconvenient and a source of annoyance to users. A need therefore exists for techniques that can reduce the frequency of user account lockouts in a manner that does not undermine system security.

SUMMARY

Illustrative embodiments of the invention provide client-side user authentication control based at least in part on an incorrect password history maintained in a client device. Such arrangements can advantageously avoid situations in which a user account might otherwise be inadvertently locked out due to repeated submission of an incorrect password to the same authentication server. The illustrative embodiments can therefore substantially reduce the frequency of user account lockouts in a manner that does not undermine system security. Moreover, these embodiments can be implemented by altering only client-side password processing functionality, and therefore without any need to modify authentication servers and associated user authentication protocols.

In one embodiment, an apparatus includes at least one processing device comprising a processor coupled to a memory. The processing device implements a client configured to communicate with one or more authentication servers over a network. The client is configured to perform client-side portions of one or more user authentication protocols carried out between the client and at least one of the one or more authentication servers. The client is further configured to store, for one or more instances of a given one of the user authentication protocols carried out for a particular user, an incorrect password history comprising identifiers of one or more passwords previously entered by the user and indicated as being incorrect passwords by at least one of the one or more authentication servers, and to determine, for an additional password entered by the user but not yet submitted by the client to the one or more authentication servers, whether or not the additional password is part of the incorrect password history. Responsive to the additional password being part of the incorrect password history, the client is further configured to generate an alert for presentation to the user to indicate that the additional password may be an incorrect password.

The alert may be generated and presented to the user in some embodiments only if the incorrect password history contains identifiers of at least a threshold number of incorrect passwords.

The client may be further configured, responsive to presentation of the alert to the user, to receive an override command from the user, and to submit the additional password to the one or more authentication servers responsive to receipt of the override command from the user.

Additionally or alternatively, the client may be further configured, responsive to presentation of the alert to the user, to receive another password from the user, and if the other password is not part of the incorrect password history, to submit the other password to the one or more authentication servers in place of the additional password.

In some embodiments in which there are multiple authentication servers, the client is further configured to maintain the incorrect password history on a per-server basis such that the incorrect password history comprises separate sets of incorrect password history information for respective ones of the authentication servers. For example, the client may include in each of the sets of incorrect password history information a listing identifying no more than n most recently rejected passwords submitted by the client for the particular user to the corresponding one of the authentication servers.

These and other illustrative embodiments include, without limitation, systems, apparatus, methods and computer program products comprising processor-readable storage media.

DETAILED DESCRIPTION

Illustrative embodiments of the present invention will be described herein with reference to exemplary information processing systems and associated processing devices. It is to be appreciated, however, that embodiments of the invention are not restricted to use with the particular illustrative system and device configurations shown. Accordingly, the term "information processing system" as used herein is intended to be broadly construed, so as to encompass, for example, a wide variety of different processing platforms including cloud-based processing platforms that include combinations of virtual and physical compute, network and storage resources.

Figure 1:
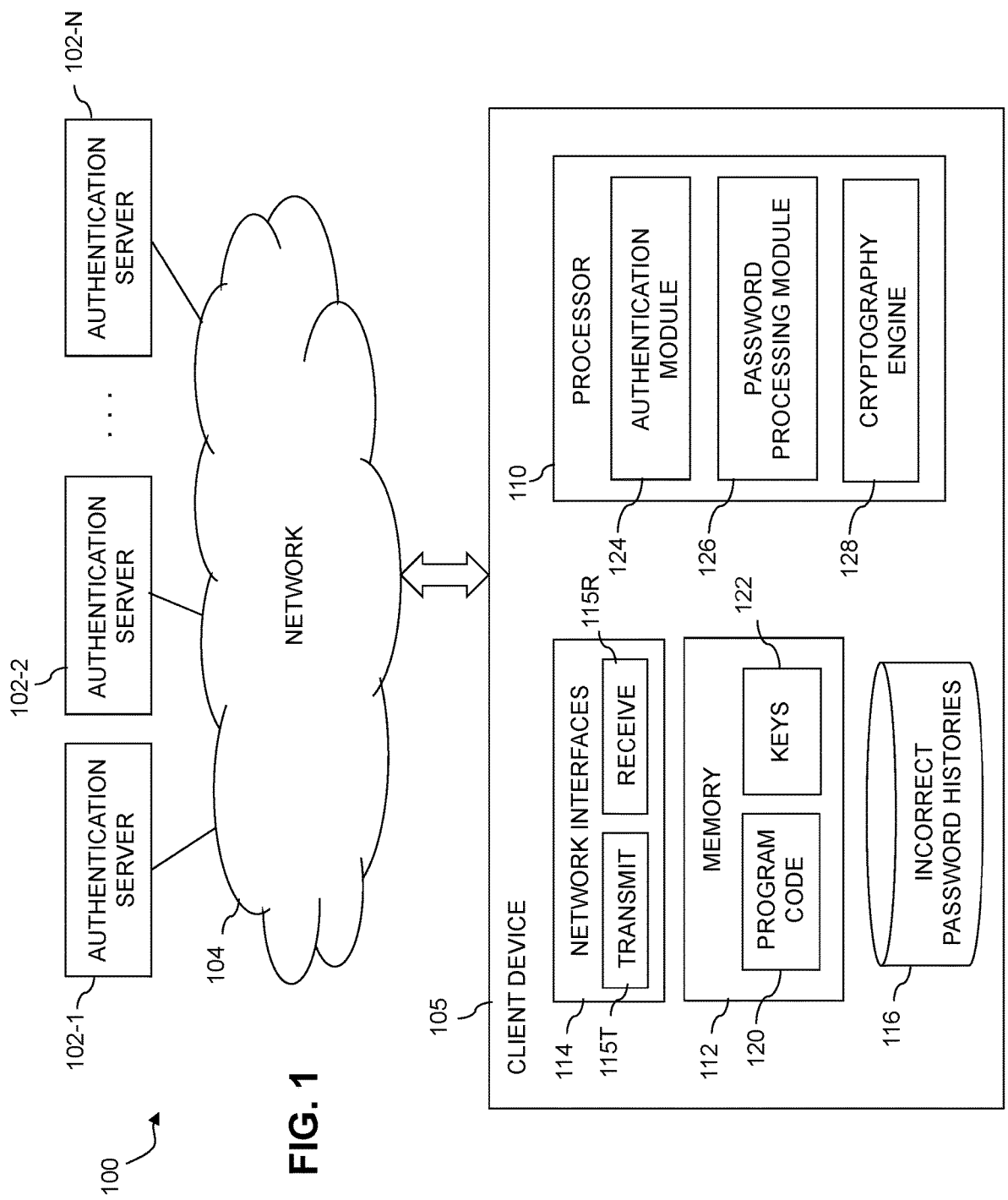
FIG. 1 is a block diagram of an information processing system comprising a client device implementing client-side user authentication control utilizing incorrect password history in an illustrative embodiment.

FIG. 1 shows an information processing system 100 configured in accordance with an illustrative embodiment of the invention. The information processing system 100 comprises a plurality of authentication servers 102-1, 102-2, . . . 102-N, collectively referred to herein as authentication servers 102. The authentication servers 102 are coupled to a network 104. Also coupled to the network 104 is a client device 105.

The client device 105 may comprise, for example, a mobile telephone, a laptop computer, a tablet computer, a desktop computer or another type of device from which a user authenticates to at least one of the authentication servers 102. Such devices are examples of what are more generally referred to herein as "processing devices." It is also possible that the client device 105 may be implemented at least in part using cloud-based virtualization infrastructure such as a virtual machine or container.

The client device 105 in some embodiments comprises a computer associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the information processing system 100, including a wide area network (WAN), a local area network (LAN), a satellite network, a telephone or cable network, a cellular network, a wireless network such as a WiFi or WiMAX network, or various portions or combinations of these and other types of networks. The information processing system 100 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

In the present embodiment, the client device 105 is configured to communicate over the network 104 with the authentication servers 102.

The client device 105 in the FIG. 1 embodiment is assumed to be implemented using at least one processing device. Each such processing device generally comprises at least one processor and an associated memory, and implements one or more functional modules for controlling certain features of the client device 105.

More particularly, the client device 105 in this embodiment comprises a processor 110 that interacts with a memory 112 and with a plurality of network interfaces 114. The processor 110 is assumed to be coupled to the memory 112 and to the network interfaces 114 via one or more signal buses or other interconnection mechanisms not explicitly shown in the figure.

The processor 110 illustratively comprises a microprocessor, a microcontroller, an application-specific integrated circuit (ASIC), a field-programmable gate array (FPGA) or other type of processing circuitry, as well as portions or combinations of such circuitry elements.

The memory 112 illustratively comprises random access memory (RAM), read-only memory (ROM), flash memory or other types of memory, in any combination. The memory 112 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interfaces 114 allow the client device 105 to communicate over the network 104 with the authentication servers 102, and illustratively comprise transmit components 115T and receive components 115R of one or more transceivers.

The client device 105 further comprises an incorrect password histories database 116. The incorrect password histories database 116 stores at least one incorrect password history for each of one or more users of the client device 105. For example, multiple distinct incorrect password histories may be maintained for respective ones of a plurality of user accounts of a particular user of the client device 105.

The incorrect password histories database 116 in the present embodiment is illustratively implemented as part of one or more storage systems coupled to or otherwise associated with one or more processing devices that are utilized to implement the client device 105. Such storage systems can comprise any of a variety of different types of storage including by way of example network-attached storage (NAS), storage area networks (SANs), direct-attached storage (DAS) and distributed DAS, as well as combinations of these and other storage types, including but not limited to flash storage, storage arrays, software-defined storage, cloud storage and object-based storage.

Although shown as being arranged internally to the client device 105, the incorrect password histories database 116 in some embodiments can be at least in part external to the client device 105. Also, at least portions of the incorrect password histories database 116 can additionally or alternatively be implemented as an in-memory database utilizing the memory 112 of the client device 105.

The memory 112 in this embodiment further comprises program code 120 and cryptographic keys 122. The program code 120 illustratively comprises software that is utilized by the processor 110 to implement functionality for client-side user authentication control based at least in part on incorrect password history within the client device 105. The cryptographic keys 122 illustratively comprise respective cryptographic keys for carrying user authentication protocols between the client device 105 and one or more of the authentication servers 102 within the system 100.

The processor 110 further comprises an authentication module 124, a password processing module 126 and a cryptography engine 128.

The client device 105 is also referred to herein as simply a "client." A processing device can be configured to implement client functionality of the type disclosed herein at least in part in the form of software or firmware of the processor 110. A processing device implementing such client functionality is an example of what is referred to herein as a client device or simply a "client."

In this embodiment, the client device 105 is configured to perform client-side portions of one or more user authentication protocols carried out between the client device 105 and at least one of the authentication servers 102. Such client-side portions of the user authentication protocols are illustratively performed under the control of the authentication module 124 of the processor 110, possibly also utilizing cryptography engine 128 and one or more of the cryptographic keys 122.

For one or more instances of a given one of the user authentication protocols carried out for a particular user, the client device 105 is configured to store in the incorrect password histories database 116 an incorrect password history comprising identifiers of one or more passwords previously entered by the user and indicated as being incorrect passwords by at least one of the authentication servers 102. Other incorrect password histories are assumed to be stored in the incorrect password histories database 116 for other users, user accounts and/or user authentication protocols.

In some embodiments, the identifiers of the one or more passwords previously entered by the user and indicated as being incorrect passwords by at least one of the authentication servers 102 may comprise information generated by applying a cryptographic function to the passwords, possibly using the cryptography engine 128 and one or more of the cryptographic keys 122. For example, the cryptographic function applied to the passwords to generate the stored identifiers of the incorrect password history may comprise a well-known cryptographic hash function such as SHA1 or MD5. In an arrangement of this type, the incorrect password history is stored in the incorrect password histories database 116 with the corresponding one or more passwords in hashed form.

Alternatively, the identifiers of the one or more passwords previously entered by the user and indicated as being incorrect passwords by at least one of the authentication servers 102 may comprise the passwords themselves.

Storing hashes or other cryptographic functions of the incorrect passwords rather than the incorrect passwords themselves provides additional security in the client device 105, as the incorrect passwords are not maintained in plaintext form in the client device 105. Also, the hash of a given incorrect password need only be stored once, even if that same incorrect password is entered multiple times. Thus, for example, the password processing module 126 may associate a count with each unique incorrect password hash, indicating the number of times the corresponding incorrect password was entered. Such counts and other similar types of information relating to previous entry of incorrect passwords are stored as part of the incorrect password history for the associated user, user account and/or user authentication protocol. A given identifier within the incorrect password history for the user may therefore correspond to multiple entry instances of the same incorrect password.

A wide variety of other types of identifiers can be used in the client device 105 for storing incorrect password histories in the incorrect password histories database 116. The term "identifier" as used herein in conjunction with a given incorrect password is therefore intended to be broadly construed, so as to encompass, for example, a hash or other cryptographic function of the incorrect password, the incorrect password itself, or other types of alternative identifiers that can be used to prevent repeated submission of incorrect passwords to a given one of the authentication servers 102 in the manner disclosed herein.

The client device 105 is further configured to determine, for an additional password entered by the user but not yet submitted by the client device 105 to the authentication servers 102, whether or not the additional password is part of the incorrect password history stored for that user in the incorrect password histories database 116. Responsive to the additional password being part of the incorrect password history, the client device 105 generates an alert for presentation to the user to indicate that the additional password may be an incorrect password.

Such operations are illustratively performed by the password processing module 126, which is configured to compare passwords entered by a user against the corresponding incorrect password history stored in the incorrect password histories database 116, before those passwords are submitted by the client device 105 to at least one of the authentication servers 102, so as to ensure that the client device 105 is not repeatedly submitting an incorrect password in a manner that might otherwise lead to inadvertent lock-out of the user account.

The alert can be presented to the user via a display screen or other user interface of the client device 105. Various types of visual, audible and/or haptic alerts may be generated. In some embodiments, the alert is generated and presented to the user only if the incorrect password history contains identifiers of at least a threshold number of incorrect passwords, such as two or more incorrect passwords. Alternatively, an alert can be generated even if there is an identifier of only a single incorrect password in the incorrect password history, if the user re-enters the corresponding incorrect password.

Responsive to presentation of the alert to the user, the client device 105 may receive an override command from the user, directing that the client device 105 should submit the entered password anyway, even though it appears from the incorrect password history that the entered password may be an incorrect password. For example, the user may have recently updated the password for the user account at one of the authentication servers 102, such that the apparently incorrect password based on the incorrect password history for that user and user account is actually a correct password. The presentation of the incorrect password alert to the user can therefore include a button or other type of actuatable icon labeled with a legend such as "Submit Password Anyway." Actuation of such a button or icon by the user is considered an example of entry of an override command. Other types of override commands can be used in other embodiments. Responsive to receipt of such an override command, the client device 105 submits the additional password to at least one of the authentication servers 102 as part of the user authentication protocol.

Alternatively, the client device 105, responsive to presentation of the alert to the user, may receive another password from the user instead of an override command. In this case, the client device 105, after first determining that the new password is not part of the incorrect password history, submits the new password to at least one of the authentication servers 102 in accordance with the user authentication protocol, in place of the previously-entered password that was determined to be part of the incorrect password history.

In some embodiments, the client device 105 is configured to maintain the incorrect password history for a given user on a per-server basis such that the incorrect password history comprises separate sets of incorrect password history information for respective ones of the authentication servers 102.

The client device 105 may include in each of the sets of incorrect password history information a listing identifying no more than n most recently rejected passwords submitted by the client for the particular user to the corresponding one of the authentication servers. Thus, older incorrect passwords are automatically eliminated from the sets of incorrect password history information maintained by the client device 105 for respective ones of the authentication servers 102, subject to the n-password threshold parameter enforced for each of those sets of incorrect password information.

Additionally or alternatively, the client device 105 can delete a given one of the identifiers from the incorrect password history responsive to expiration of a timer associated with that identifier. This is another example of a mechanism for automatically limiting the incorrect password history to only recently-entered incorrect passwords.

In some embodiments, the client device 105 deletes the identifiers from the incorrect password history responsive to an indication from a given one of the authentication servers 102 that a particular password submitted by the client device 105 for the particular user is in fact a correct password. In arrangements of this type, the incorrect password history for the user is in effect reset responsive to successful authentication of the user to one of the authentication servers 102 as part of the user authentication protocol.

It should be noted that the term "password" as used herein is intended to be broadly construed, so as to encompass, for example, a passcode, a passphrase or other arrangement of information utilized to authenticate a user to one of the authentication servers 102.

Also, terms such as "submitting" or "submission" of a password from the client device 105 to one or more of the authentication servers 102 should not be construed as limited to submission of the password itself. For example, the password can be submitted in encrypted form, or after being subject to other types of cryptographic operations. Submission of a password herein may therefore involve submission of information derived from the password in the client device 105 in a manner that permits a receiving one of the authentication servers 102 to authenticate the user based on that information.

Accordingly, the client device 105 may be configured to submit the password to a given one of the authentication servers 102 in the form of authentication information computed as a cryptographic function of the password.

Alternatively, the client device 105 may be configured to submit the password to a given one of the authentication servers 102 in the form of authentication information computed using the password and a challenge received by the client device 105 from the given authentication server.

The client device 105 can therefore be configured to operate with any of a wide variety of different password-based protocols.

For example, the user authentication protocol carried out between the client device 105 and one of the authentication servers 102 may comprise a Kerberos-type protocol, in which the client device 105 sends an authenticator that illustratively comprises the time of day encrypted under a user password. Submission of the authenticator to an authentication server is considered to be a type of submission of a password as that term is broadly used herein.

In such an arrangement, the receiving authentication server may be configured to indicate that the submitted password is incorrect by generating an error message back to the client device 105 if the authentication server detects that the wrong password was used to encrypt the authenticator.

As another example, the user authentication protocol carried out between the client device 105 and one of the authentication servers 102 may comprise a Challenge-Handshake Authentication Protocol (CHAP) or another type of challenge-based authentication protocol, in which the client device 105 receives a challenge from the authentication server, and responds by sending a hash of at least a portion of the challenge and a user password. Again, a submission of authentication information of this type is considered to be a type of submission of a password as that term is broadly used herein.

Numerous other alternative arrangements of password submission are possible, depending upon the particular requirements of the user authentication protocol being carried out between the client device 105 and one or more of the authentication servers 102.

As indicated above, aspects of the client-side user authentication control in the FIG. 1 embodiment are implemented at least in part through cooperative interaction of authentication module 124, password processing module 126 and cryptography engine 128 of the processor 110 in the client device 105.

It is to be appreciated that the particular arrangement of modules 124, 126 and 128 illustrated in the processor 110 of the FIG. 1 embodiment is presented by way of example only, and alternative arrangements can be used in other embodiments. For example, the functionality associated with the modules 124, 126 and 128 in other embodiments can be combined into a single module, or separated across a larger number of modules. As another example, multiple distinct processors can be used to implement different ones of the modules 124, 126 and 128 or portions thereof.

At least portions of the modules 124, 126 and 128 may be implemented at least in part in the form of software comprising program code 120 stored in memory 112 and executed by processor 110.

It should also be understood that the particular set of elements shown in FIG. 1 for implementing functionality for client-side user authentication control based at least in part on incorrect password history in information processing system 100 is presented by way of illustrative example only, and in other embodiments additional or alternative elements may be used. Thus, another embodiment may include additional or alternative systems, devices and other network entities, as well as different arrangements of modules and other components.

An illustrative embodiment of an example process for client-side user authentication control based at least in part on incorrect password history in the information processing system 100 will now be described in more detail with reference to the flow diagram of FIG. 2.

In this embodiment, it is assumed that a user associated with the client device 105 is attempting to access a user account over the network 104, and that access to the user account from the client device 105 requires successful user authentication to at least one of the authentication servers 102.

The process as illustrated includes steps 200 through 216, all of which are assumed to be performed primarily by the client device 105, also referred to as simply the "client" in the figure, and an associated user. It is to be understood that this particular process is only an example, and additional or alternative processes can be carried out in other embodiments.

In step 200, the client receives a password from the user. As indicated above, the term "password" as used herein is intended to be broadly construed, so as to encompass, for example, a passcode, a passphrase or other arrangement of information utilized to authenticate a user to at least one authentication server.

In step 202, the client determines if the password is in the incorrect password history maintained by the client for this user, user account and/or user authentication protocol. If the password is not part of the incorrect password history, the process moves to step 204, and otherwise moves to step 206.

In step 204, the client has determined that the password is not part of the incorrect password history, and therefore submits the password to an appropriate authentication server as part of the user authentication protocol. As described previously herein, submission of the password in some embodiments may involve submission of authentication information that is computed based at least in part on the password, rather than submission of the actual password itself. Alternatively, the password itself may be submitted. All such arrangements are considered "submission of a password" as that term is broadly used herein.

In step 206, the client has determined that the password is part of the incorrect password history, and therefore generates an alert to the user.

In step 208, the client determines if an override command has been received from the user. If the override command has been received, the process moves to step 204 to submit the password to the appropriate authentication server, and otherwise moves to step 210.

In step 210, the client has determined that no override command has been received. The user re-enters a password, and the process returns to step 200 to process the re-entered password in the manner previously described.

In step 212, the client determines if the submitted password has been accepted by the authentication server as a correct password. If the password is accepted by the authentication server, the process moves to step 214, and otherwise moves to step 216.

In step 214, the user obtains access to the desired user account based on submission of a correct password as part of the user authentication process. The process then ends as illustrated, but may be repeated for subsequent instances of user authentication protocols for the particular user or other users and/or user accounts.

In step 216, the client has determined that the password was not accepted by the authentication server, and so the incorrect password history is updated to include the rejected password. The user is notified of the rejection, and the process then returns to step 210 to allow the user to enter another password.

Figure 2:
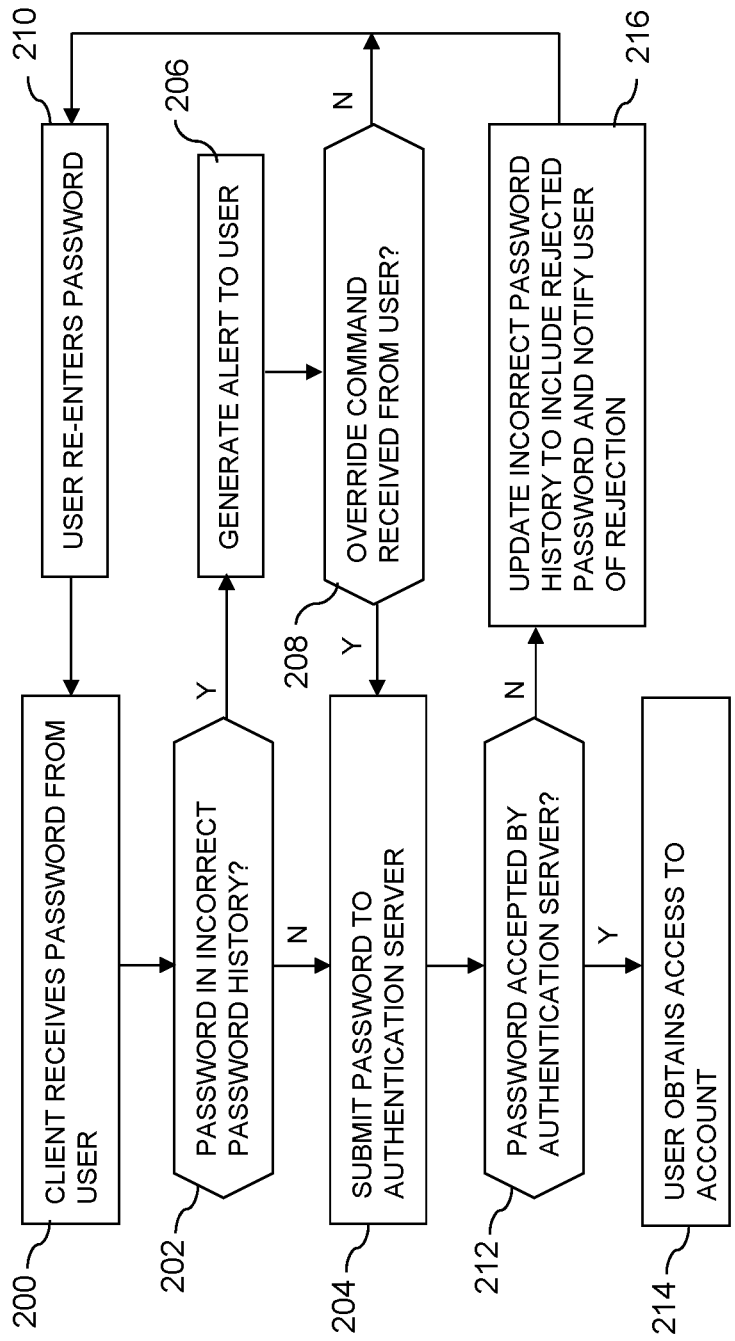
FIG. 2 is a flow diagram of an example process for client-side authentication control utilizing incorrect password history in an illustrative embodiment.

The particular processing operations and other system functionality described in conjunction with the flow diagram of FIG. 2 are presented by way of illustrative example only, and should not be construed as limiting the scope of the invention in any way. Alternative embodiments can use other types of processing operations to implement client-side user authentication control based on incorrect password history. For example, certain steps may be performed at least in part concurrently with one another rather than serially. As additional examples, one or more of the process steps may be repeated periodically for different user authentication protocol instances, and multiple such processing instances can be performed in parallel with one another to provide client-side user authentication control for different users and/or user accounts within a given information processing system.

Also, functionality such as that described in conjunction with the flow diagram of FIG. 2 can be implemented at least in part in the form of one or more software programs stored in program code 120 of memory 112 and executed by processor 110. As mentioned previously, a storage device or other memory having executable program code of one or more software programs embodied therein is an example of what is more generally referred to herein as a "processor-readable storage medium."

The foregoing example process is therefore illustrative only, and should not be viewed as limiting the scope of any particular embodiment in any way. Those skilled in the art will appreciate that numerous alternative client-side user authentication control arrangements can be used in other embodiments.

Illustrative embodiments provide a number of significant advantages relative to conventional arrangements. For example, one or more such embodiments avoid situations in which a user account might otherwise be inadvertently locked out due to repeated submission of an incorrect password to the same authentication server.

The illustrative embodiments can substantially reduce the frequency of user account lockouts in a manner that does not undermine system security.

In addition, some embodiments can be implemented by altering only client-side password processing functionality, and therefore without any need to modify authentication servers and associated user authentication protocols.

The disclosed techniques can be adapted in a straightforward manner for use with a wide variety of different types of client devices and associated client-side authentication protocol code running on those client devices.

It is to be appreciated that the foregoing advantages are illustrative of advantages provided in certain embodiments, and need not be present in other embodiments.

The information processing systems disclosed herein are illustratively implemented using one or more processing platforms, examples of which will be now be described in greater detail. A given such processing platform comprises at least one processing device comprising a processor coupled to a memory.

In some embodiments, portions of an information processing system as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the information processing system 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices.

Processing devices and other information processing system components can communicate with one another using a variety of different communication protocols and associated communication media.

As indicated previously, components of an information processing system as disclosed herein can be implemented at least in part in the form of one or more software programs stored in memory and executed by a processor of a processing device.

It should again be emphasized that the above-described embodiments of the invention are presented for purposes of illustration only. Many variations and other alternative embodiments may be used. For example, the disclosed techniques are applicable to a wide variety of other types of information processing systems and associated processing devices. Also, the particular features of the illustrative embodiments of FIGS. 1 and 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing device comprising a processor coupled to a memory;
   the processing device implementing a client configured to communicate with one or more authentication servers over a network;
   the client being configured to perform client-side portions of one or more user authentication protocols carried out between the client and at least one of the one or more authentication servers;
   wherein the client is further configured:
   to store, for one or more instances of a given one of the user authentication protocols carried out for a particular user, an incorrect password history comprising identifiers of one or more passwords previously entered by the user and indicated as being incorrect passwords by at least one of the one or more authentication servers;
   to determine, for an additional password entered by the user but not yet submitted by the client to the one or more authentication servers, whether or not the additional password is part of the incorrect password history; and
   responsive to the additional password being part of the incorrect password history, to generate an alert for presentation to the user to indicate that the additional password may be an incorrect password.

2. The apparatus of claim 1 wherein the alert is generated and presented to the user only if the incorrect password history contains identifiers of at least a threshold number of incorrect passwords.

3. The apparatus of claim 1 wherein the client is further configured, responsive to presentation of the alert to the user, to receive an override command from the user, and to submit the additional password to the one or more authentication servers responsive to receipt of the override command from the user.

4. The apparatus of claim 1 wherein the client is further configured, responsive to presentation of the alert to the user, to receive another password from the user, and if the other password is not part of the incorrect password history, to submit the other password to the one or more authentication servers in place of the additional password.

5. The apparatus of claim 1 wherein the one or more authentication servers comprise a plurality of authentication servers and wherein the client is further configured to maintain the incorrect password history on a per-server basis such that the incorrect password history comprises separate sets of incorrect password history information for respective ones of the authentication servers.

6. The apparatus of claim 5 wherein the client is further configured to include in each of the sets of incorrect password history information a listing identifying no more than n most recently rejected passwords submitted by the client for the particular user to the corresponding one of the authentication servers.

7. The apparatus of claim 1 wherein the client is further configured to store the incorrect password history with the corresponding one or more incorrect passwords in hashed form.

8. The apparatus of claim 1 wherein the identifiers of the one or more passwords previously entered by the user and indicated as being incorrect passwords by at least one of the one or more authentication servers comprise the passwords themselves.

9. The apparatus of claim 1 wherein the identifiers of the one or more passwords previously entered by the user and indicated as being incorrect passwords by at least one of the one or more authentication servers comprise information generated by applying a cryptographic function to the passwords.

10. The apparatus of claim 9 wherein the cryptographic function comprises a hash function.

11. The apparatus of claim 1 wherein the client is further configured to delete a given one of the identifiers from the incorrect password history responsive to expiration of a timer associated with that identifier.

12. The apparatus of claim 1 wherein the client is further configured to delete the identifiers from the incorrect password history responsive to an indication from a given one of the one or more authentication servers that another password submitted by the client for the particular user is a correct password.

13. The apparatus of claim 1 wherein the client is further configured to submit the password to a given one of the one or more authentication servers in the form of authentication information computed as a cryptographic function of the password.

14. The apparatus of claim 1 wherein the client is further configured to submit the password to a given one of the one or more authentication servers in the form of authentication information computed using the password and a challenge received by the client from the given authentication server.

15. A method comprising:
configuring a client to perform client-side portions of one or more user authentication protocols carried out between the client and one or more authentication servers over a network;
storing in the client, for one or more instances of a given one of the user authentication protocols carried out for a particular user, an incorrect password history comprising identifiers of one or more passwords previously entered by the user and indicated as being incorrect passwords by at least one of the one or more authentication servers;
determining in the client, for an additional password entered by the user but not yet submitted by the client to the one or more authentication servers, whether or not the additional password is part of the incorrect password history; and
responsive to the additional password being part of the incorrect password history, generating in the client an alert for presentation to the user to indicate that the additional password may be an incorrect password;
wherein the method is performed by at least one processing device comprising a processor coupled to a memory.

16. The method of claim 15 wherein the client is further configured, responsive to presentation of the alert to the user, to receive an override command from the user, and to submit the additional password to the one or more authentication servers responsive to receipt of the override command from the user.

17. The method of claim 15 wherein the one or more authentication servers comprise a plurality of authentication servers and wherein the client is further configured to maintain the incorrect password history on a per-server basis such that the incorrect password history comprises separate sets of incorrect password history information for respective ones of the authentication servers.

18. A computer program product comprising a non-transitory processor-readable storage medium having stored therein program code of one or more software programs, wherein the program code when executed by at least one processing device causes said processing device:
to configure a client to perform client-side portions of one or more user authentication protocols carried out between the client and one or more authentication servers over a network;
to store in the client, for one or more instances of a given one of the user authentication protocols carried out for a particular user, an incorrect password history comprising identifiers of one or more passwords previously entered by the user and indicated as being incorrect passwords by at least one of the one or more authentication servers;
to determine in the client, for an additional password entered by the user but not yet submitted by the client to the one or more authentication servers, whether or not the additional password is part of the incorrect password history; and
responsive to the additional password being part of the incorrect password history, to generate in the client an alert for presentation to the user to indicate that the additional password may be an incorrect password.

19. The computer program product of claim 18 wherein the client is further configured, responsive to presentation of the alert to the user, to receive an override command from the user, and to submit the additional password to the one or more authentication servers responsive to receipt of the override command from the user.

20. The computer program product of claim 18 wherein the one or more authentication servers comprise a plurality of authentication servers and wherein the client is further configured to maintain the incorrect password history on a per-server basis such that the incorrect password history comprises separate sets of incorrect password history information for respective ones of the authentication servers.

* * * * *